United States Patent [19]
Gotou

[11] Patent Number: 6,010,237
[45] Date of Patent: Jan. 4, 2000

[54] HEAD LAMP DEVICE FOR VEHICLE

[75] Inventor: Shinichirou Gotou, Wako, Japan

[73] Assignee: Honda Giken Kogyo Kabushiki Kaisha, Tokyo, Japan

[21] Appl. No.: 09/012,129

[22] Filed: Jan. 22, 1998

[30] Foreign Application Priority Data

Jan. 29, 1997 [JP] Japan ................... 9-015066

[51] Int. Cl.⁷ .................................. B60Q 1/08
[52] U.S. Cl. ................ 362/460; 362/465; 362/466; 362/467; 362/459
[58] Field of Search ............................ 362/459, 460, 362/465, 466, 467

[56] References Cited

U.S. PATENT DOCUMENTS

| | | |
|---|---|---|
| 4,858,080 | 8/1989 | Oikawa . |
| 4,908,560 | 3/1990 | Shibata et al. .................... 318/603 |
| 4,973,155 | 11/1990 | Masuda .................... 356/121 |
| 5,158,352 | 10/1992 | Ikegami et al. . |
| 5,416,465 | 5/1995 | Lin . |
| 5,479,323 | 12/1995 | Shibata et al. .................... 362/71 |
| 5,526,242 | 6/1996 | Takahashi et al. .................... 362/83.3 |
| 5,562,336 | 10/1996 | Gotou .................... 362/37 |
| 5,588,733 | 12/1996 | Gotou .................... 362/37 |
| 5,876,113 | 3/1999 | Gotoh .................... 362/466 |
| 5,896,085 | 4/1999 | Mori et al. .................... 340/469 |
| 5,907,196 | 5/1999 | Hayami et al. .................... 307/10.8 |

FOREIGN PATENT DOCUMENTS

| | | |
|---|---|---|
| 62-77249 | 4/1987 | Japan . |
| 3-14742 | 1/1991 | Japan . |
| 2208919 | 4/1989 | United Kingdom . |

*Primary Examiner*—Sandra O'Shea
*Assistant Examiner*—John A. Ward
*Attorney, Agent, or Firm*—Carrier, Blackman & Associates, P.C.; Joseph P. Carrier; William D. Blackman

[57] ABSTRACT

A head lamp device for a vehicle capable of moving a lighting region of a head lamp in front of the vehicle in rightward and leftward directions. This device comprises steering angle detecting means for detecting a steering angle; displacement quantity setting means for setting a quantity of displacement of the lighting region based on the steering angle detected by the steering angle detecting means; vehicle speed detecting means for detecting a vehicle speed; maximum displacement quantity setting means for setting a maximum quantity of displacement of the lighting region based on the vehicle speed detected by the vehicle speed detecting means; and control means for controlling displacement of the lighting region in accordance with the quantity of displacement set by the displacement quantity setting means when the quantity of displacement is less than the maximum quantity of displacement set by the maximum displacement quantity setting means, and controlling displacement of the lighting region in accordance with the maximum quantity of displacement when the quantity of displacement is more than the maximum quantity of displacement.

15 Claims, 6 Drawing Sheets

HEAD LAMP DEVICE FOR VEHICLE

BACKGROUND OF THE INVENTION

1. Field of the Invention

The present invention relates to a light distribution control of a head lamp device for a vehicle capable of moving a lighting region of a head lamp in front of the vehicle in rightward and leftward directions.

2. Description of the Invention

Hitherto, various head lamp devices capable of moving a lighting region of a head lamp in rightward and leftward directions have been proposed. In almost all of them, basically, a light distribution control is carried out in response to a steering angle of a steering wheel in consideration of vehicle speed (Japanese Laid-Open Patent Publications No. Sho 62-77249, No. Hei 3-14742, etc.) and the lighting region of the head lamp is moved to a direction of the steering to increase a lighting amount in the direction to which the vehicle is just going to advance.

However, for example, if a sensor for detecting the steering angle of the steering wheel is out of order by some causes, a discrepancy arises between a direction which should be lighted and a direction actually lighted, and the driver may be given a sense of incongruity.

SUMMARY OF THE INVENTION

The present invention has been accomplished in view of the foregoing and it is an object of the present invention to provide a head lamp device for a vehicle in which movement of a lighting region of a head lamp is always restrained to a quantity below a maximum displacement quantity set based on a vehicle speed so that a driver is not given a sense of incongruity even if a sensor becomes out of order.

In order to accomplish the aforesaid object, the present invention provides a head lamp device for a vehicle capable of moving a lighting region of a head lamp in front of the vehicle in rightward and leftward directions, comprising: steering angle detecting means for detecting a steering angle of the vehicle; displacement quantity setting means for setting a quantity of displacement of the lighting region based on the steering angle detected by the steering angle detecting means; vehicle speed detecting means for detecting a vehicle speed; maximum displacement quantity setting means for setting a maximum quantity of displacement of the lighting region based on the vehicle speed detected by the vehicle speed detecting means; and control means for controlling displacement of the lighting region in accordance with the quantity of displacement set by the displacement quantity setting means when the quantity of displacement is less than the maximum quantity of displacement set by the maximum displacement quantity setting means, and controlling displacement of the lighting region in accordance with the maximum quantity of displacement when the quantity of displacement is more than the maximum quantity of displacement.

The maximum quantity of displacement set by the maximum displacement quantity setting means based on a vehicle speed is a quantity of displacement of the lighting region for a minimum turning radius based from the vehicle speed at which the vehicle can stably run. Therefore, it is unnecessary to move the lighting region beyond the maximum quantity of displacement. In addition, when the steering angle detecting means indicates continuously a quantity of displacement larger than the maximum quantity of displacement, it may be considered that the steering means is out of order.

Since the lighting region is moved in accordance with the quantity of displacement set by the displacement quantity setting means based on the steering angle when the quantity of displacement is less than the maximum quantity of displacement and moved in accordance with the maximum quantity of displacement when the quantity of displacement is larger than the maximum quantity of displacement, in any case the lighting region is not moved unnecessarily, the driver is not given a sense of incongruity, and out-of-order conditions of the steering angle detecting means can be coped with.

According to another aspect of the present invention, there is provided a head lamp device for a vehicle capable of moving a lighting region of a head lamp in front of the vehicle in rightward and leftward directions, comprising: lateral movement quantity detecting means for detecting a quantity of lateral movement of the vehicle; displacement quantity setting means for setting a quantity of displacement of the lighting region based on the quantity of lateral movement detected by the lateral movement quantity detecting means; vehicle speed detecting means for detecting a vehicle speed; maximum displacement quantity setting means for setting a maximum quantity of displacement of the light region based on the vehicle speed detected by the vehicle speed detecting means; and control means for controlling displacement of the lighting region in accordance with the quantity of displacement set by the displacement quantity setting means when the quantity of displacement is less than the maximum quantity of displacement set by the maximum displacement quantity setting means, and controlling displacement of the lighting region in accordance with the maximum quantity of displacement when the quantity of displacement is more than the maximum quantity of displacement.

Since the lighting region is moved in accordance with the quantity of displacement set by the displacement quantity setting means based on the lateral movement such as a yaw rate when the quantity of displacement is less than the maximum quantity of displacement and moved in accordance with the maximum quantity of displacement when the quantity of displacement is larger than the maximum quantity of displacement, in any case the lighting region is not moved unnecessarily, the driver is not given a sense of incongruity, and out-of-order conditions of the steering angle detecting means can be coped with.

According to a further aspect of the present invention, there is provided a head lamp device for a vehicle capable of moving a lighting region of a head lamp in front of the vehicle in rightward and leftward directions, comprising map information outputting means for outputting map information including road data; present location detecting means for detecting a present location of the vehicle on the map information; displacement quantity setting means for setting a quantity of displacement of the lighting region by forecasting a shape of a road in front of the vehicle based on the map information and the present location; vehicle speed detecting means for detecting a vehicle speed; maximum displacement quantity setting means for setting a maximum quantity of displacement of the lighting region based on the vehicle speed detected by the vehicle speed detecting means; and control means for controlling displacement of the lighting region in accordance with the quantity of displacement set by the displacement quantity setting means when the quantity of displacement is less than the maximum quantity of displacement set by the maximum displacement quantity setting means, and controlling displacement of the lighting region in accordance with the maximum quantity of displacement when the quantity of displacement is more than the maximum quantity of displacement.

The lighting region is moved in accordance with the quantity of displacement, which is set by the displacement quantity setting means by forecasting the shape of a road in front of the vehicle based on the map information and the present location, when the set quantity of displacement is less than the maximum quantity of displacement. On the one hand, the lighting region is moved in accordance with the maximum quantity of displacement when the quantity of displacement is more than the maximum quantity of displacement. Accordingly, in any case the lighting region is not moved unnecessarily, the driver is not given a sense of incongruity, and out-of-order conditions of the present location detecting means can be coped with.

In the above-mentioned head lamp devices for a vehicle, the control means may stop controlling displacement of the lighting region when a state in which the quantity of displacement set by the displacement quantity setting means is more than the maximum quantity of displacement set by the maximum displacement quantity setting means continues during a predetermined time.

When the state in which the quantity of displacement set by the displacement quantity setting means is more than the maximum quantity of displacement set by the maximum displacement quantity setting means continues during the predetermined time, there is a great possibility that the steering angle detecting means, the lateral movement detecting means or the present location detecting means is out of order. Therefore, in such a case, control of movement of the lighting region is stopped so as not to give the driver trouble.

The lighting region may be returned in the direct front of the vehicle when the control means stops controlling displacement of lighting region. When there is a great possibility that the steering angle detecting means, the lateral movement detecting means or the present location detecting means is out of order, the lighting region is returned in the direct front of the vehicle so that visibility of the front can be insured.

DETAILED DESCRIPTION OF THE PREFERRED EMBODIMENTS

Hereinafter, a first preferred embodiment of the present invention will be described with reference to FIGS. 1 to 5.

Figure 1:
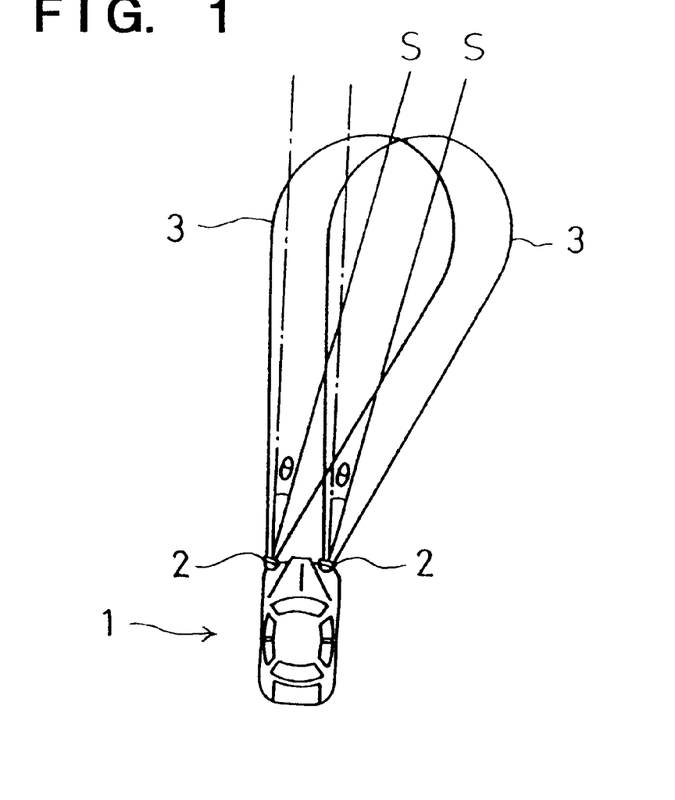
FIG. 1 is a plan view showing a vehicle equipped with a head lamp device according to one embodiment of the present invention together with a lighting region as viewed from above.

A vehicle 1 of the first preferred embodiment has head lights 2 for lighting the space in front of the vehicle installed such that they are swingable in rightward and leftward horizontal directions. FIG. 1 shows the vehicle 1 viewed from above and in this figure, the right and left head lights 2, 2 are swung rightward so as to cause the right forward regions to become lighting regions 3, 3.

The right and left head lights 2, 2 are preferably swung together in the same direction by the same angle and, as shown in FIG. 1, angles of their optical axes S, S with respect to an advancing direction of the vehicle 1, i.e. quantities of displacement of lighting regions 3, 3 are both set to be θ.

Regarding the angle θ, that on the right side with respect to the advancing direction is viewed positive or given a plus sign and that on the left side is viewed negative or given a minus sign.

Alternatively, only a head light on the turning side may be swung or the right and left head lights may be swung by respective angles different from each other.

Figure 2:
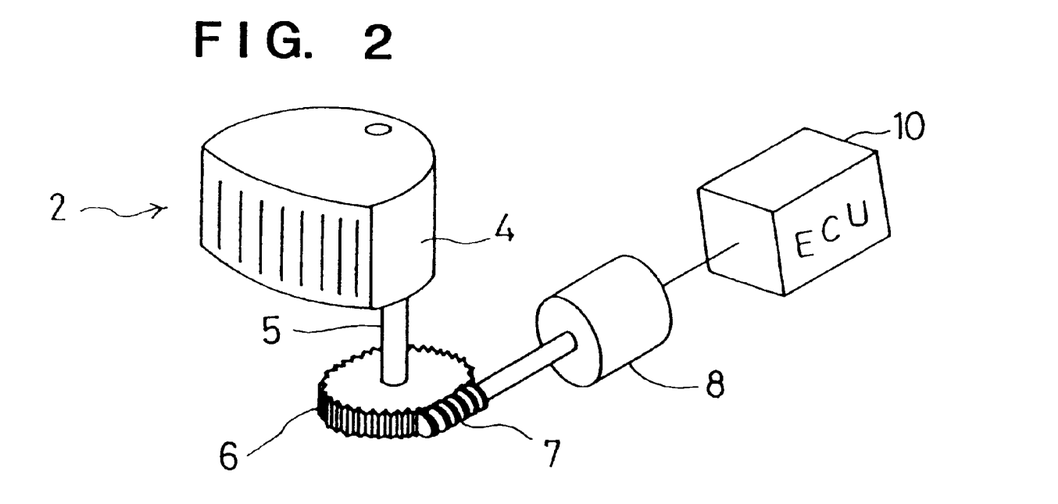
FIG. 2 is a schematic perspective view showing a swinging mechanism for a head light of the preferred embodiment.

A swinging mechanism for swinging the head light 2 in the preferred embodiment is schematically shown in FIG. 2, wherein a lamp unit 4 of the head light 2 is fixed to a rotary shaft 5, and a worm 7 formed at a driving shaft of a motor 8 is engaged with a worm wheel 6 fitted to the rotary shaft 5.

Accordingly, the lamp unit 4 is swung together with the rotary shaft 5 through an engagement between the worm 7 and the worm wheel 8 under a driving force of the motor 8. The motor 8 is controlled for its driving by a light distribution control ECU 10.

Figure 3:
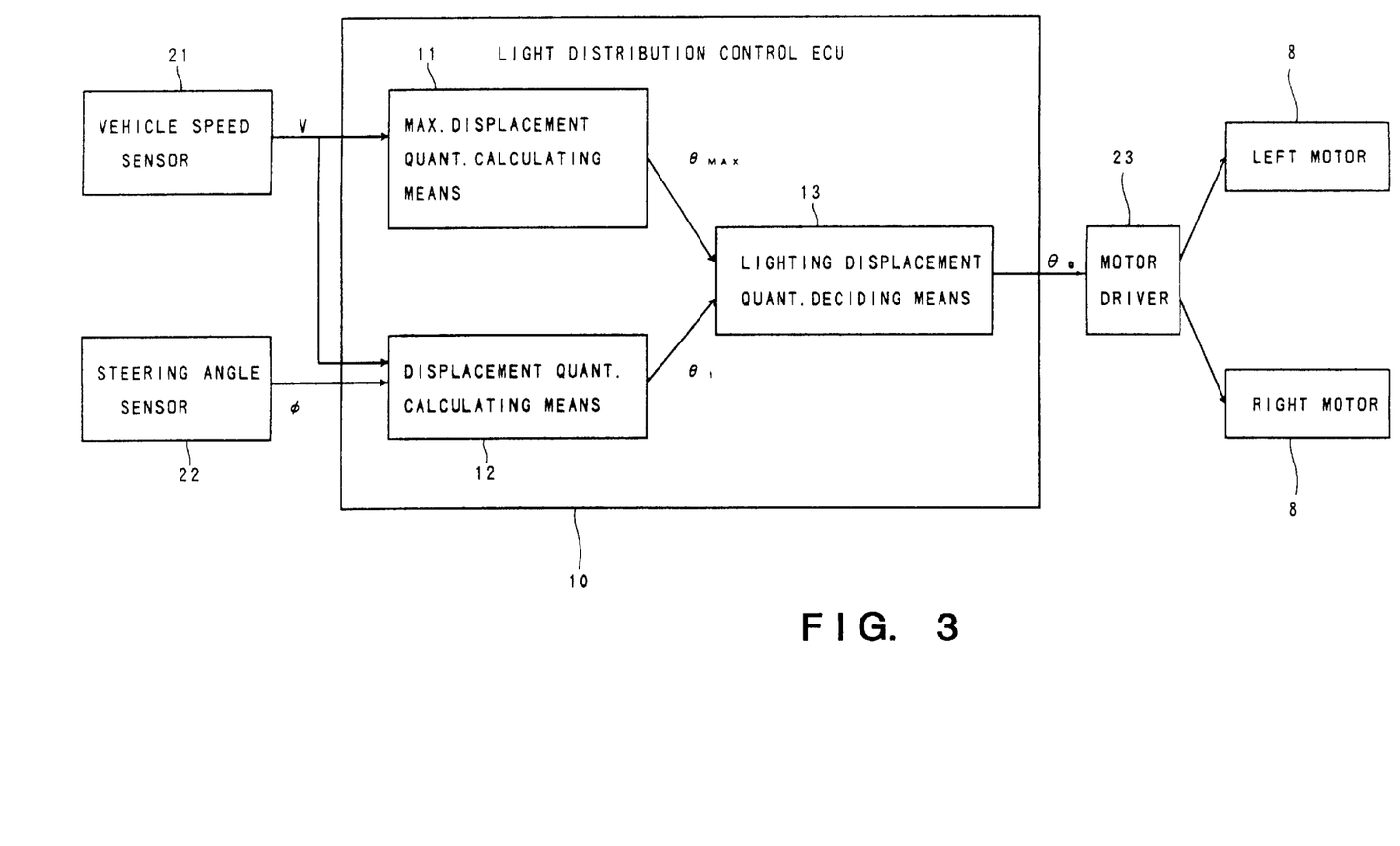
FIG. 3 is a rough block diagram showing a system for controlling light distribution according to the preferred embodiment.

FIG. 3 is a rough block diagram showing a control system for controlling movement of the lighting region or light distribution in the first preferred embodiment of the invention.

The vehicle 1 has a vehicle speed sensor 21 for detecting vehicle speed v and a steering angle sensor 22 for detecting a direction of the front wheel with respect to the vehicle body or a steering angle φ.

The vehicle speed v detected by the vehicle speed sensor 21 is inputted to a maximum displacement quantity calculating means 11 in the light distribution control ECU 10 for calculating a maximum quantity of displacement $\theta_{MAX}$ of the lighting region. The steering angle φ detected by the steering angle sensor 22 and the vehicle speed v are also inputted to a displacement quantity calculating means 12 of the light distribution control ECU 10 for calculating a quantity of displacement $\theta_1$.

Then a lighting displacement quantity deciding means 13 compares the maximum quantity of displacement $\theta_{MAX}$ with the quantity of displacement θ and decides finally a lighting displacement quantity $\theta_0$ and a control signal based on the lighting displacement quantity $\theta_0$ is outputted to a motor driver 23 which drives the right and left motors 8, 8 to swing the head lights 2 by the lighting displacement quantity $\theta_0$.

A procedure for the above light distribution control will be described, including a mannner of calculation with reference to the flow chart in FIG. 4.

At first, an anticipated minimum turning radius $R_{MIN}$ of the vehicle is calculated from the vehicle speed v detected by the vehicle speed sensor 21 (Step 1).

When the vehicle turns along a curve of a radius R at a vehicle speed v, a lateral acceleration occurring in a normal direction is $v^2/R$ (m/s$^2$). If the lateral acceleration is required to be below a predetermined value G (m/s$^2$) in order that the vehicle can turn stably, the anticipated minimum turning radius $R_{MIN}$ is expressed by the following formula.

$$R_{MIN} = v^2/G$$

For example, When the vehicle speed v is 80 Km/h and the predetermined lateral acceleration G is 0.9 g (g: acceleration of gravity), $$R_{MIN} = (80 \times 1000/3600)^2/(0.5 \times 9.8) \approx 100(m)$$

At Step 2, a maximum quantity of displacement $\theta_{MAX}$ of the lighting region is calculated from the anticipated minimum turning radius $R_{MIN}$ and the vehicle speed v as discussed further below.

Figure 5:
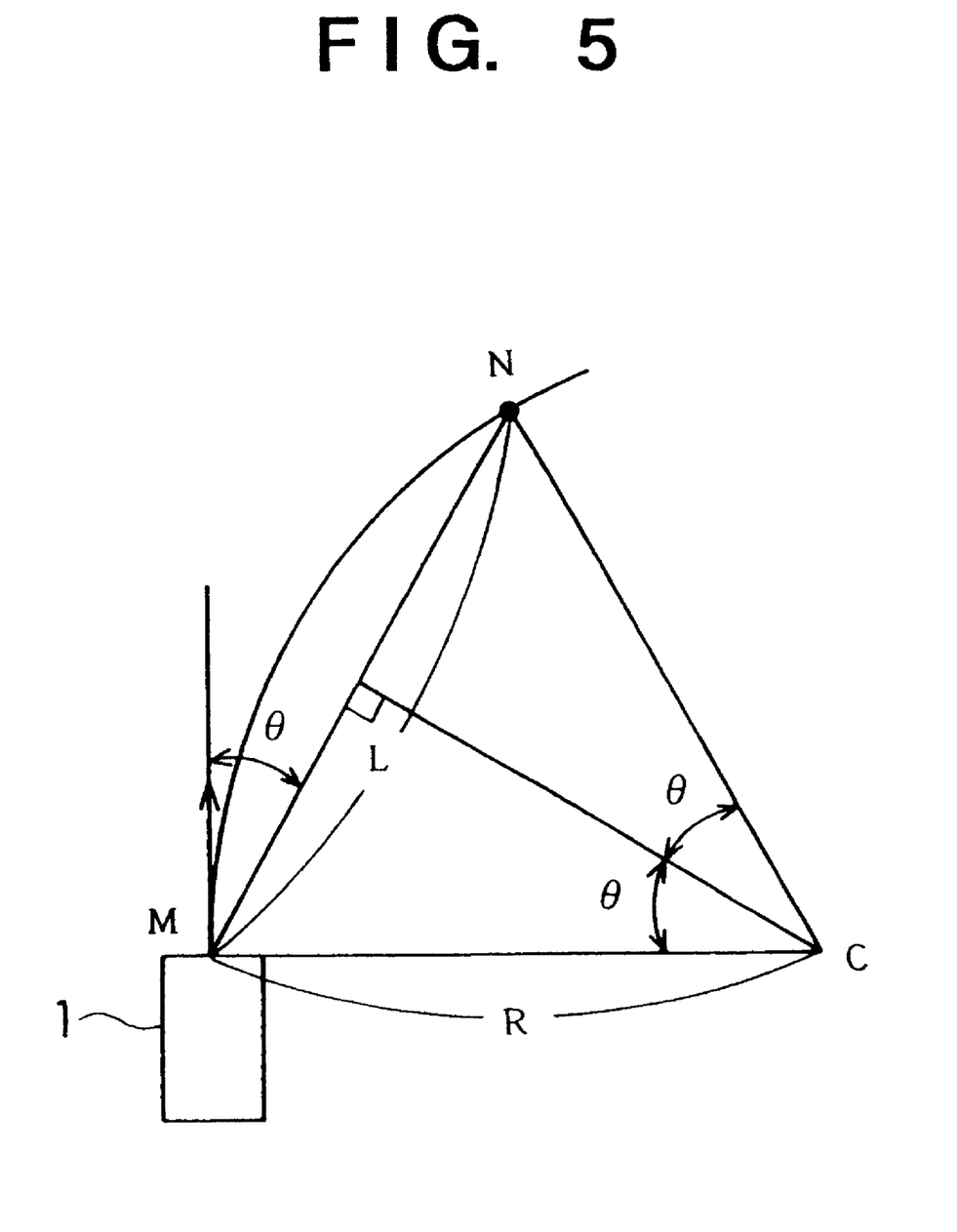
FIG. 5 is an illustration for explaining a way to introduce a quantity of displacement θ of a lighting region from a vehicle speed v and a turning radius R.

Referring to FIG. 5, on the assumption that the vehicle 1 turns along a right curve of turning radius R, a front watch point N is imaged on a circular arc of radius R extending from the position M of the vehicle 1 and having its center at the turning center C of the vehicle.

The front watch point means a position where a vehicle running at a speed v will reach after a predetermined time T (sec), for example after 2 seconds, namely a position apart from the vehicle by a distance L (=T×$_v$), and generally it is regarded as adequate that a head lamp lights toward the front watch point. In FIG. 5, the front watch point N is taken at a position on the circular arc apart from the position M of the vehicle 1 by the distance L.

An angle made between a direct front direction of the vehicle 1 (a direction tangential to the circular arc MN at the point M) and a straight line MN connecting the points M, N is the quantity of displacement $\theta$ of the lighting region and the angle $\theta$ is equal to a half of the center angle NCM ranging over the circular arc MN. Therefore, $$\sin\theta = L/2R$$

A quantity of displacement $\theta$ obtainable by using the anticipated minimum turning radius $R_{MIN}$ for the turning radius R in the above formula is the maximum quantity of displacement $\theta_{MAX}$, which is calculated by the following formula at Step 2.

$$\theta_{MAX} = \sin^{-1}(L/2R_{MIN}) = \sin^{-1}(T \times v/2R_{MIN})$$

For example, when T is 2 (sec), $$\theta_{MAX} = \sin^{-1}\{(2 \times 80 \times 1000/3600)/(2 \times 100)\} = 12.8(\text{deg.})$$

At Step 3, a quantity of displacement $\theta_1$ of the lighting region based on the steering angle is calculated from a steering angle $\phi$ detected by the steering angle sensor 22 and a vehicle speed v detected by the vehicle speed sensor 21 according to the following formula, $$\theta_1 = kv\phi$$

where k is a factor of proportionality, namely, it is regarded that the quantity of displacement $\theta_1$ is proportional to the vehicle speed v and the steering angle $\phi$.

After the maximum quantity of displacement $\theta_{MAX}$ and the quantity of displacement $\theta_1$ are calculated in such a manner as mentioned above, at Step 4, an absolute value $|\theta_{MAX}|$ of the maximum quantity of displacement $\theta_{MAX}$ and an absolute value $|\theta_1|$ of the quantity of displacement $\theta_1$ are compared to decide which is larger.

When $|\theta_1|$ is smaller than or equal to $|\theta_{MAX}|$, the flow advances to Step 5 and $\theta_1$ is adopted as the lighting displacement quantity $\theta_0$. When $|\theta_1|$ is larger than $|\theta_{MAX}|$, the flow advances to Step 8 and $\theta_{MAX}$ is adopted as the lighting displacement quantity $\theta_0$.

In the former case that $\theta_1$ is adopted as the lighting displacement quantity $\theta_0$ at Step 5, a count value n is set to be 0 at Step 6 and control of movement of the lighting region is carried out based on the lighting displacement quantity $\theta_0$ (=$\theta_1$) at Step 7, and then the flow returns to Step 1. Thus, when $|\theta_1|$ is smaller than or equal to $|\theta_{MAX}|$, the light distribution is controlled by the quantity of displacement $\theta_1$ based on the steering angle $\phi$.

In the latter case that $\theta_{MAX}$ is adopted as the lighting displacement quantity $\theta_0$ at Step 8, the count value n is added with 1 at Step 9 and it is discriminated whether or not the count value n is larger than a predetermined value $n_1$ at Step 10.

If the count value n is smaller than or equal to the predetermined value $n_1$, the flow jumps to Step 7 to carry out the lighting region movement control by the lighting movement quantity $\theta_0$ (=$\theta_{MAX}$), and then returns to Step 1. Thus, when $|\theta_1|$ is larger than $|\theta_{MAX}|$, the light distribution is controlled by he maximum quantity of displacement $\theta_{MAX}$ until the count value n reaches the predetermined value $n_1$.

Since the maximum quantity of displacement $\theta_{MAX}$ has been introduced from the anticipated minimum turning radius $R_{MIN}$ based on the vehicle speed v, it is not necessary to displace the lighting region beyond the maximum quantity of displacement $\theta_{MAX}$. Therefore, when $|\theta_1|$ is larger than $|\theta_{MAX}|$, the lighting region is fixed at the maximum quantity of displacement $\theta_{MAX}$ to insure a good driver visibility to some extent.

On the other hand, when the quantity of displacement $\theta_1$ is larger than the maximum quantity of displacement $\theta_{MAX}$, there is a possibility that the steering angle sensor is out of order.

If the state that $|\theta_1|$ larger than $|\theta_{MAX}|$ is continues beyond a predetermined time and the count value n reaches the predetermined value $n_1$, the flow advances from Step 10 to Step 11 where the lighting displacement quantity $\theta_0$ is set at 0. Namely, the lighting region is returned to the direct front direction of the vehicle 1 and the light distribution control is stopped.

When the state that $|\theta_1|$ is larger than $|\theta_{MAX}|$ continues beyond a predetermined time ($n_1$=10 for example), it is considered that the steering angle sensor 22 is out of order by some cause. Therefore, in such a case, first of all, the lighting region is returned to the direct front direction and the control is stopped to maintain vehicle operation with a good front visibility, anticipating a later repair of the steering angle sensor.

Next, another preferred embodiment of the invention will be described with regard to FIG. 6.

In the above-mentioned first preferred embodiment, the quantity of displacement $\theta_1$ of the lighting region is decided based on the steering angle $\phi$ and usually the lighting region is moved according to the quantity of displacement $\theta_1$. However, in the present preferred embodiment, the quantity of displacement $\theta_1$ of the lighting region is decided based on a yaw rate (yaw angular velocity) $\omega$ which is a quantity of lateral movement of the vehicle detected by a yaw rate sensor, in place of the steering angle $\phi$.

Figure 6:
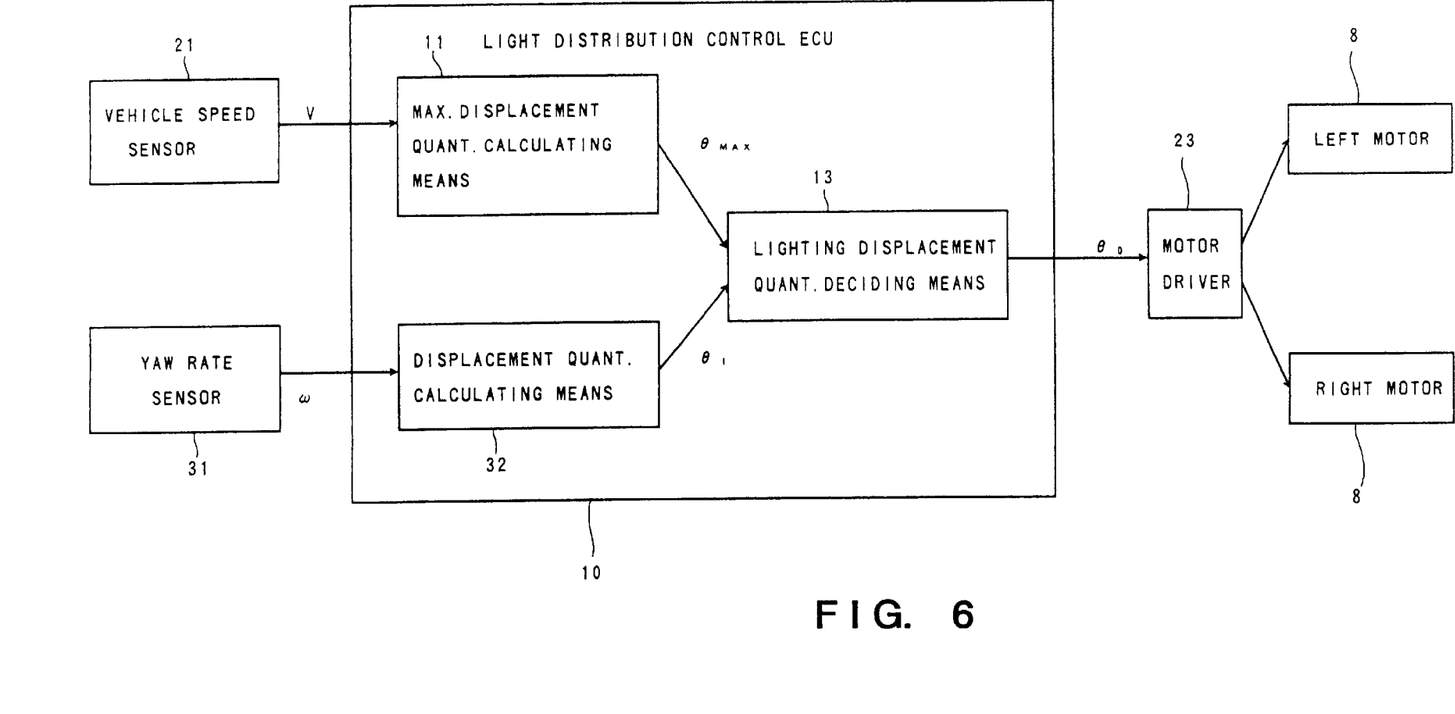
FIG. 6 is a rough block diagram showing a system for controlling light distribution according to another preferred embodiment.

FIG. 6 is a rough block diagram of a light distribution control system according to the present embodiment. A yaw rate sensor 31 is provided in place of the steering angle sensor 22 of the above-mentioned embodiment, and the displacement quantity calculating means 32 calculates the quantity of displacement $\theta_1$ of the lighting region based on only the yaw rate $\omega$ detected by the yaw rate sensor 31 without taking the vehicle speed v into consideration.

When the vehicle is turning at a vehicle speed of v (m/s) and a yaw rate of $\omega$ (rad/s), its turning radius R (m) is v/$\omega$. Therefore, referring to FIG. 5, $$\theta_1 = \sin^{-1}(Tv/2R) = \sin^{-1}(T\omega/2)$$

The quantity of displacement $\theta_1$ of the lighting region is calculated regardless the vehicle speed v.

If T is set at 2 seconds also in this case, $$\theta_1 = \sin^{-1}\omega$$

Figure 4:
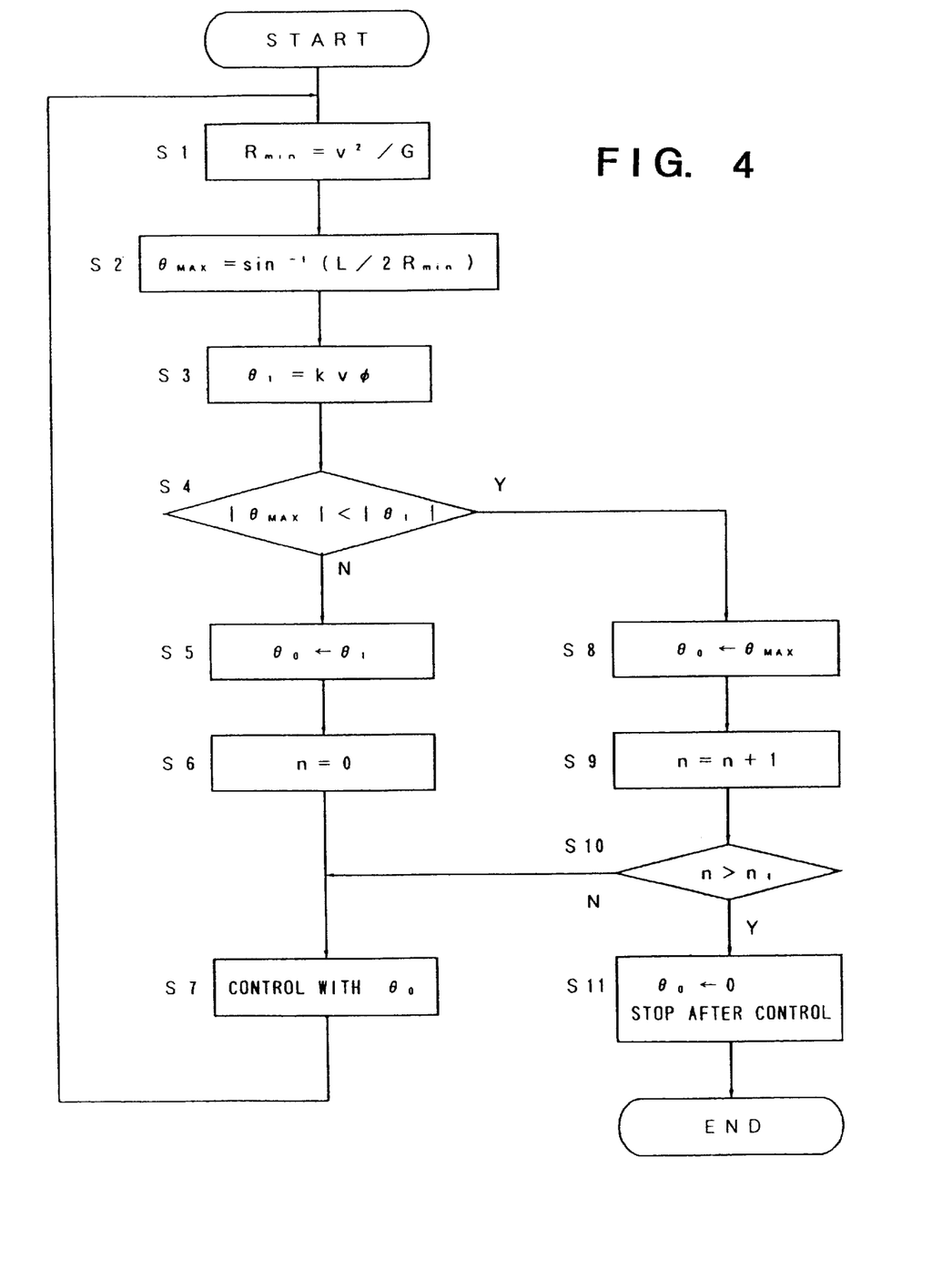
FIG. 4 is a flow chart showing a light distribution control procedure according to the preferred embodiment.

Since the maximum quantity of displacement $\theta_{MAX}$ of the lighting region is obtained from the anticipated minimum turning radius $R_{MIN}$ in the same manner as the aforementioned embodiment, the light distribution control can be carried out according to the substantially same flow chart as that of FIG. 4 in which only calculation of $\theta_1$ at Step 3 is to be changed to $$\theta_1 = \sin^{-1}(T\omega/2)$$

Therefore, when $|\theta_1|$ is smaller than or equal to $|\theta_{MAX}|$, the light distribution control is carried out according to the quantity of displacement $|\theta_1|$ based on the yaw rate $\omega$, and when $|\theta_1|$ becomes larger than $|\theta_1|$, the light distribution control according to the maximum quantity of displacement $|\theta_{MAX}|$ is carried out until the count value n reaches the predetermined value $n_1$.

When the state that $|\theta_1|$ is larger than $|\theta_{MAX}|$ continues beyond a predetermined time ($n_1=10$ for example), it is considered that the yaw rate sensor 31 is out of order.

Therefore in such a case, first of all, the lighting region is returned to the direct front direction and the control is stopped to maintain vehicle operation with a good visibility, anticipating a later repair of the yaw rate sensor.

Figure 7:
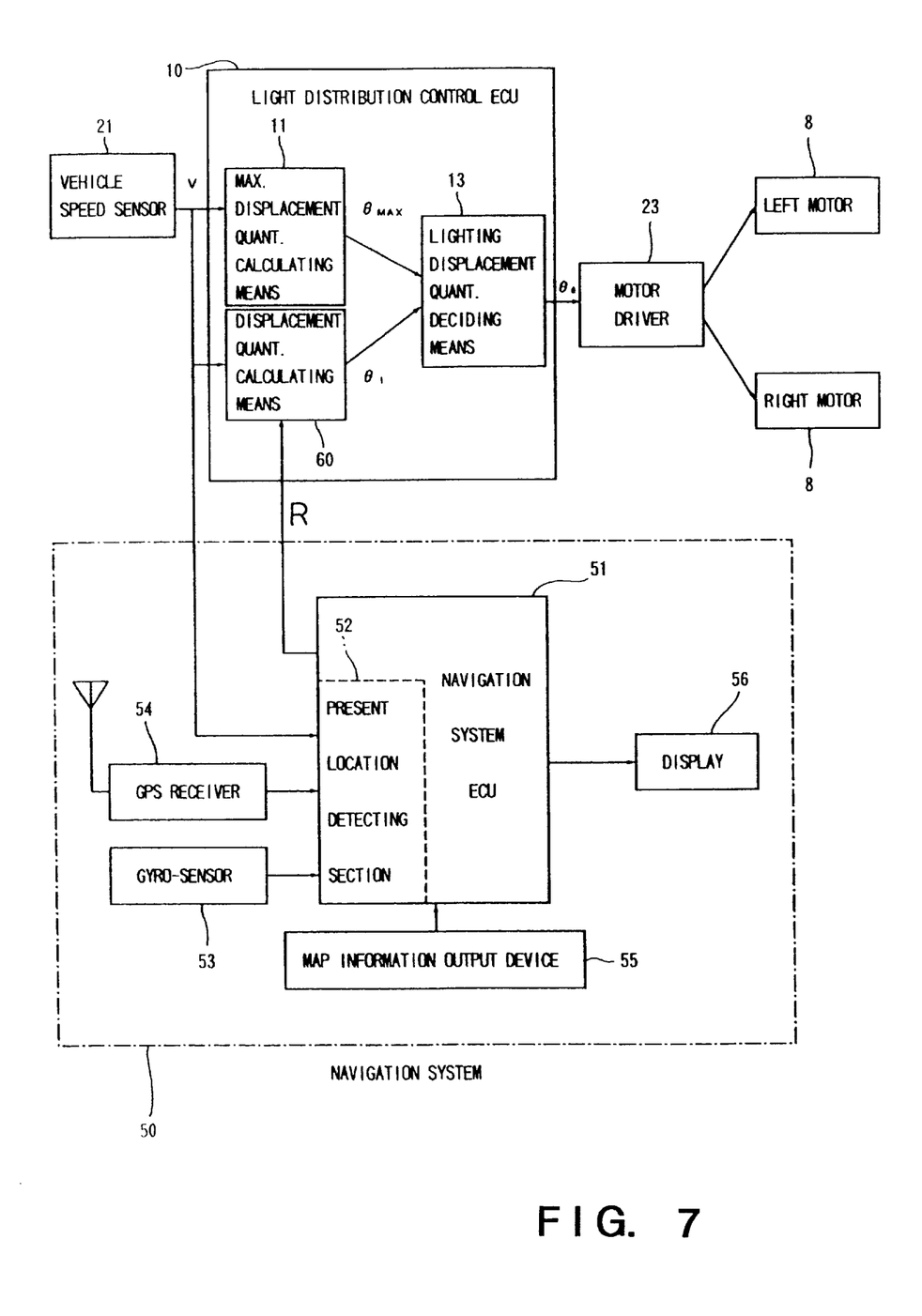
FIG. 7 is a rough block diagram showing a system for controlling light distribution according to still another preferred embodiment.

FIG. 7 shows a rough block diagram of a light distribution control system according to still another preferred embodiment of the invention.

In this embodiment, the vehicle is provided with a navigation system 50 to be used as a substitute of the steering angle sensor 22 of the embodiment shown in FIG. 3. Usually the quantity of displacement $\theta_1$ of the lighting region is decided based on a turning radius R of a road in front along which the vehicle is expected to run, for movement of the lighting region.

In a navigation system ECU 51 which is the center of the navigation system, a present location detecting section 52 receives detection signals from a gyro-sensor 53 and the vehicle speed sensor 21, calculates movement of the vehicle to obtain a vehicle location and carries out map-matching. In addition, the present location detecting section 52 corrects the above vehicle location by a vehicle location obtained from satellite electric waves received by a GPS receiver 54 to establish an exact vehicle location. The vehicle location obtained in such a manner is displayed on a display 56 together with road data outputted from a map information outputting device 55.

In the navigation system 50, a large number of predetermined nodes which can be passed in order along a road are set. Intervals between respective neighboring nodes are different according to locations. Generally, the interval is large at a straight road portion, and narrow at a curved road portion. One node is set at every crossing.

Various map information on the map, an extent of curve of a road at a node for example, are stored corresponding to respective nodes. Further, the navigation system 50 has a route conducting function for selecting a shortest route to a destination and conducting the vehicle along the route.

Therefore, the navigation system 50 can extract a curve, that is a turning radius R, of a road in front and output it to displacement quantity calculating means 60 of the light distribution control ECU 10. At the displacement quantity calculating means 60, the quantity of displacement $\theta_1$ of the lighting region is calculated according to the following formula (refer to FIG. 5).

$$\theta_1 = \sin^{-1}(Tv/2R)$$

The light distribution control can be carried out according to substantially the same flow chart as that of FIG. 4 in which only calculation of $\theta_1$ at Step 3 is to be changed to $\theta_1 = \sin^{-1}(Tv/2R)$.

Therefore, when $|\theta_1|$, is smaller than or equal to $|\theta_{MAX}|$, the light distribution control is carried out according to the quantity of displacement $\theta_1$ based on the navigation system 50, and when $|\theta_1|$ becomes larger than $|\theta_{MAX}|$, the light distribution control according to the maximum quantity of displacement $\theta_{MAX}$ is carried out until the count value n reaches the predetermined value $n_1$.

When the state that $|\theta_1|$ is larger than $|\theta_{MAX}|$ continues beyond a predetermined time ($n_1=10$ for example), it is considered that the navigation system 50 is out of order by some cause. Therefore in such a case, first of all, the lighting region is returned to the direct front direction and the control is stopped to maintain vehicle operation with a good visibility anticipating a later repair of the navaigation system.

In the above-mentioned embodiments, an out-of order condition of the steering angle sensor, the yaw rate sensor or the navigation system is judged by continuation of the state that $|\theta_1|$ is larger than $|\theta_{MAX}|$. Instead, the out-of-order condition may be judged by frequent occurrences of the state that $|\theta_1|$ is larger than $|\theta_{MAX}|$.

Although there have been described what are at present considered to be the preferred embodiments of the invention, it will be understood by persons skilled in the art that variations and modifications may be made thereto without departing from the gist, spirit or essence of the invention. The scope of the invention is indicated by the appended claims, rather than by the foregoing description of the preferred embodiments.

I claim:

1. A head lamp device for a vehicle capable of moving a lighting region of a head lamp in front of the vehicle in rightward and leftward directions, comprising:

steering angle detecting means for detecting a steering angle of the vehicle;

displacement quantity setting means for setting a quantity of displacement of the lighting region based on said steering angle detected by said steering angle detecting means;

vehicle speed detecting means for detecting a vehicle speed;

maximum displacement quantity setting means for setting a maximum quantity of displacement of the lighting region based on said vehicle speed detected by said vehicle speed detecting means; and control means for controlling displacement of the lighting region in accordance with said quantity of displacement set by said displacement quantity setting means when said quantity of displacement is less than said maximum quantity of displacement set by said maximum displacement quantity setting means, and controlling displacement of the lighting region in accordance with said maximum quantity of displacement when said quantity of displacement is more than said maximum quantity of displacement.

2. A head lamp device for a vehicle capable of moving a lighting region of a head lamp in front of the vehicle in rightward and leftward directions, comprising:

lateral movement quantity detecting means for detecting a quantity of lateral movement of the vehicle;

displacement quantity setting means for setting a quantity of displacement of the lighting region based on said quantity of lateral movement detected by said lateral movement quantity detecting means;

vehicle speed detecting means for detecting a vehicle speed;

maximum displacement quantity setting means for setting a maximum quantity of displacement of the lighting region based on said vehicle speed detected by said vehicle speed detecting means; and control means for controlling displacement of the lighting region in accordance with said quantity of displacement set by said displacement quantity setting means when said quantity of displacement is less than said maximum quantity of displacement set by said maximum displacement quantity setting means, and controlling displacement of the lighting region in accordance with said maximum quantity of displacement when said quantity of displacement is more than said maximum quantity of displacement.

3. A head lamp device for a vehicle capable of moving a lighting region of a head lamp in front of the vehicle in rightward and leftward directions, comprising:

map information outputting means for outputting map information including road data;

present location detecting means for detecting a present location of the vehicle on the map information;

displacement quantity setting means for setting a quantity of displacement of the lighting region by forecasting a shape of a road in front of the vehicle based on said map information and said present location;

vehicle speed detecting means for detecting a vehicle speed;

maximum displacement quantity setting means for setting a maximum quantity of displacement of the lighting region based on said vehicle speed detected by said vehicle speed detecting means; and control means for controlling displacement of the lighting region in accordance with said quantity of displacement set by said displacement quantity setting means when said quantity of displacement is less than said maximum quantity of displacement set by said maximum displacement quantity setting means, and controlling displacement of the lighting region in accordance with said maximum quantity of displacement when said quantity of displacement is more than said maximum quantity of displacement.

4. A head lamp device for a vehicle as claimed in claim 1 wherein said control means stops controlling displacement of the lighting region when a state in which said quantity of displacement set by said displacement quantity setting means is more than said maximum quantity of displacement set by said maximum displacement quantity setting means continues during a predetermined time.

5. A head lamp device for a vehicle as claimed in claim 4, wherein said lighting region is returned in a direct front direction of said vehicle when said control means stops controlling displacement of the lighting region.

6. A head lamp device for a vehicle as claimed in claim 2, wherein said control means stops controlling displacement of the lighting region when a state in which said quantity of displacement set by said displacement quantity setting means is more than said maximum quantity of displacement set by said maximum displacement quantity setting means continues during a predetermined time.

7. A head lamp device for a vehicle as claimed in claim 6, wherein said lighting region is returned to a direct front direction of said vehicle when said control means stops controlling displacement of the lighting region.

8. A head lamp device for a vehicle as claimed in claim 3, wherein said control means stops controlling displacement of the lighting region when a state in which said quantity of displacement set by said displacement quantity setting means is more than said maximum quantity of displacement set by said maximum displacement quantity setting means continues during a predetermined time.

9. A head lamp device for a vehicle as claimed in claim 8, wherein said lighting region is returned to a direct front direction of said vehicle when said control means stops controlling displacement of the lighting region.

10. A head lamp device for a vehicle capable of moving a lighting region of a head lamp in front of the vehicle in rightward and leftward directions, comprising:

means for detecting at least one of an operating condition of the vehicle and a present location of the vehicle relative to map information including road data;

displacement quantity setting means for setting a quantity of displacement of the lighting region based on an output of said detecting means;

vehicle speed detecting means for detecting a vehicle speed;

maximum displacement quantity setting means for setting a maximum quantity of displacement of the lighting region based on said vehicle speed detected by vehicle speed detecting means; and control means for controlling displacement of the lighting region in accordance with said quantity of displacement set by said displacement quantity setting means when said quantity of displacement is less than said maximum quantity of displacement, and controlling displacement of the lighting region in accordance with said maximum quantity of displacement when said quantity of displacement is more than said maximum quantity of displacement.

11. A head lamp device for a vehicle as claimed in claim 10, wherein said detecting means detects a steering angle of the vehicle.

12. A head lamp device for a vehicle as claimed in claim 10, wherein said detecting means detects a quantity of lateral movement of the vehicle.

13. A head lamp device for a vehicle as claimed in claim 10, wherein said detecting means includes map information outputting means for outputting the map information including the road data and present location detecting means for detecting the present location of the vehicle on the map information.

14. A head lamp device for a vehicle as claimed in claim 10, wherein said control means stops controlling displacement of the lighting region when a state in which said quantity of displacement set by said displacement quantity setting means is more than said maximum quantity of displacement set by said maximum displacement quantity setting means continues for a predetermined time period.

15. A head lamp device for a vehicle as claimed in claim 14, wherein said lighting region is returned to a direct front direction of said vehicle when said control means stops controlling displacement of the lighting region.

* * * * *

UNITED STATES PATENT AND TRADEMARK OFFICE
CERTIFICATE OF CORRECTION

PATENT NO : 6,010,237
DATED : 04 January 2000
INVENTOR(S): Shinichirou Gotou

It is certified that error appears in the above-identified patent and that said Letters Patent is hereby corrected as shown below:

Column 1, line 10, change "Description of the Invention" to ––Description of Relevant Art––.

Column 5, line numbered approximately 5, change "When" to ––when––;
 line numbered between 22 and 23, change "L (= $Tx_v$)" to ––L (= T × v)––;
 line numbered between 31 and 32, change "NCM" to ––∠NCM––.

Column 6, line 18, change "he" to ––the––;
 line numbered between 31 and 32, before "larger" insert ––is––; before "continues" delete ––is––.

Column 7, 3rd line, after "regardless" insert ––of––;
 line 19, change "$|\theta_1|$" to ––$\theta_1$––;
 line 20, change "than $|\theta_1|$" to ––than $|\theta_{MAX}|$––;
 line 22, change "$|\theta_{MAX}|$" to ––$\theta_{MAX}$––.

Column 8, line 10, after "$|\theta_1|$" delete the comma;
 line numbered between 23 and 24, change "navaigation" to ––navigation––;
 line numbered between 24 and 25, change "out-of order" to ––out-of-order––.

Signed and Sealed this

Thirty-first Day of October, 2000

*Attest:*

Q. TODD DICKINSON

*Attesting Officer*     *Director of Patents and Trademarks*